Dec. 26, 1967  J. M. SHELLY  3,359,926
LIQUID MOLDING MACHINE
Filed April 8, 1966
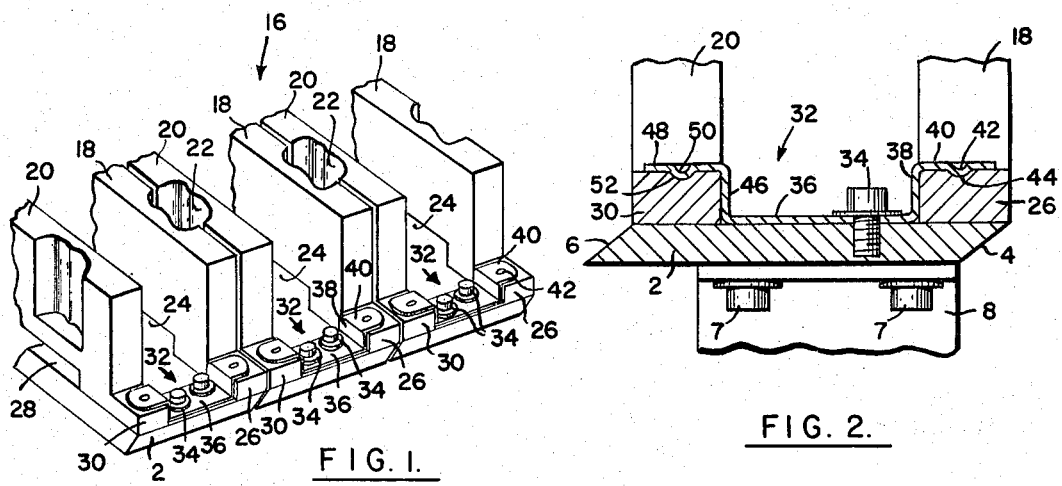
FIG. 1.
FIG. 2.
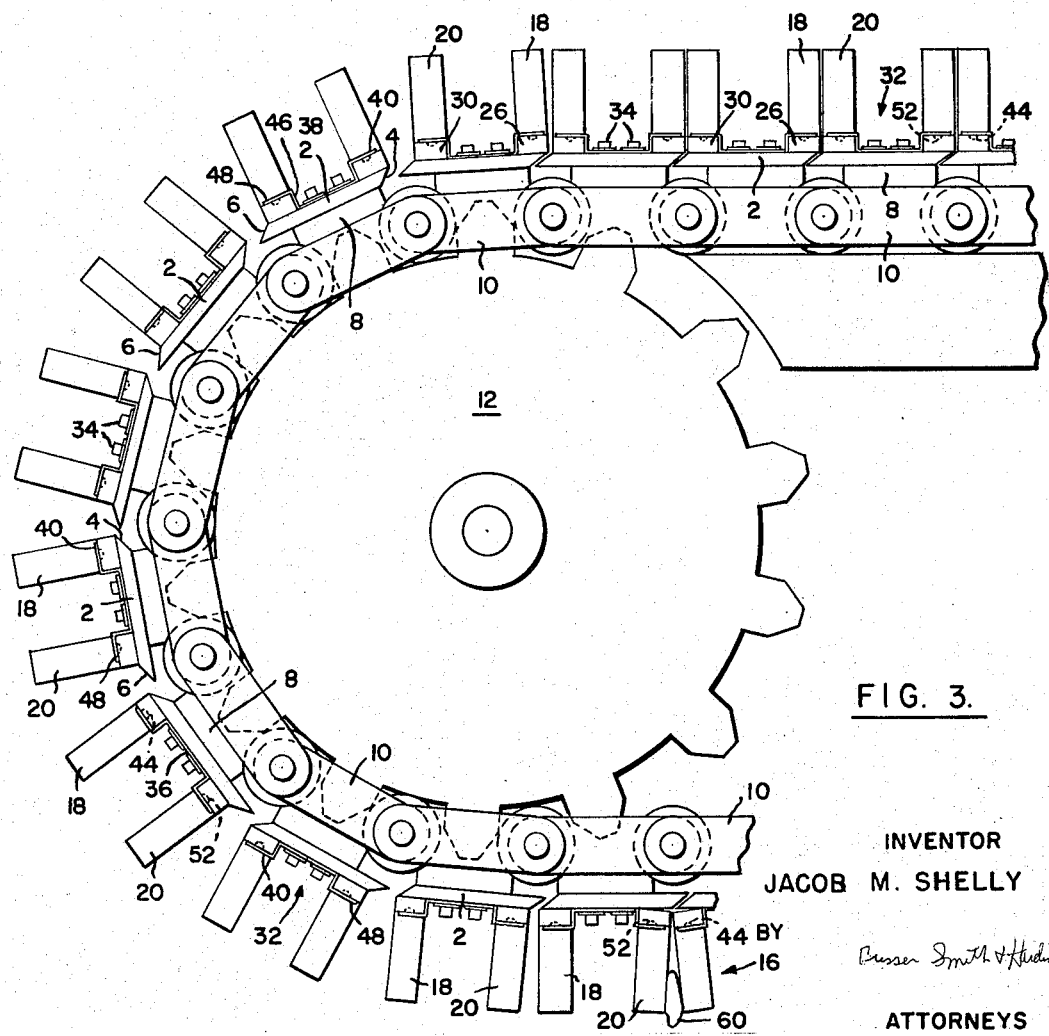
FIG. 3.
INVENTOR
JACOB M. SHELLY
BY
ATTORNEYS

3,359,926
LIQUID MOLDING MACHINE
Jacob M. Shelly, Lansdale, Pa., assignor to Shelly Bros., Inc., Lansdale, Pa., a corporation of Pennsylvania
Filed Apr. 8, 1966, Ser. No. 541,364
3 Claims. (Cl. 107—8)

This invention relates to a liquid molding machine and more particularly relates to an improvement in the mounting of split mold portions on a pair of parallel endless conveying means.

Molding machines employing a pair of parallel endless conveying means which convey split mold portions are well known to the art. Such a machine for making candy is disclosed, for example, in Patent 3,221,673 issued Dec. 7, 1965 to Jacob M. Shelly. While the machine of this patent represented a substantial advance in the art, the molds are susceptible to being damaged and disarranged. The split mold portions being rigidly mounted on the conveying endless chains are subjected to very large forces when the mold portions come together if a piece of previously formed candy is caught between the opposing flat faces of the mold portions particularly when so-called hard candy is being made. In such cases, the forces involved frequently result in a derangement of the mold supporting members or a breaking of one of the mold portions. The replacement of the mold portion structure and/or a mold portion is expensive and particularly objectionable due to the loss of machine operating time.

It is an object of this invention to eliminate the above discussed problem by a novel mold and mounting structure. In accordance with this invention there is provided mold supporting plates which advantageously are provided with chamfered forward and rear ends. The mold portions are provided with flanges which are held down by spring clips providing a yielding mounting.

The invention will be clarified on reading the following description in conjunction with the drawings in which:

FIGURE 1 is a side perspective view of an embodiment of the invention;

FIGURE 2 is a vertical section through the side of one supporting plate and its associated mold portions; and FIGURE 3 is a side elevation, partially broken away, showing the improvement of the invention incorporated in conveying means.

A plurality of mold supporting plates 2 each have a chamfered forward end 4 and a chamfered rear end 6. Each plate 2 is secured by machine screws 7 to a bracket 8 which is mounted on an endless conveying chain 10 passing around a sprocket shown at 12. The other side of each plate 2 is similarly attached to a bracket (not shown) which in turn is mounted on an endless conveying chain (not shown). It is not necessary to detail the conveying chain and the supporting bracket for the mold support plate since they are substantially identical to comparable structures shown in Patent 3,221,673.

The mold supporting plates 2 support a plurality of split molds 16 having separate portions 18 and 20 providing a mold cavity 22. Each mold portion 18 rests on the forward end of a plate 2 and has a bottom cutout portion 24 and a laterally extending flange 26 at each side (only the near side being shown in the drawings). Similarly each mold portion 20 rests on the rear end of a plate 2. Each mold portion 20 has a bottom cutaway portion 28 and a laterally extending flange 30 at each side thereof (only the near side being shown in the drawings).

A clip 32 is secured to each side of each plate 2 (only the near side being shown in the drawing) by means of machine screws 34 passing through the base portion 36 of the clip. Each clip 32 has an upstanding leg 38 and an integral forwardly extending leg 40 which tightly overlies the adjacent flange 26 of mold portion 18. Leg 40 has a boss 42 which lies in a dimpled recess 44 in flange 26. Similarly clip 32 has an upstanding leg 46 and a rearwardly extending leg 48 having a boss 50 which lies in a dimpled recess 52 in the adjacent flange 30. The clip 32 will be made of a resilient material, advantageously spring steel. It will be understood that the flanges on the far side of the mold portions 18 and 20 are similarly formed and similarly held down by a clip 32.

The mold portions 18 and 20 are readily removed or mounted since they are only yieldingly held by the adjacent spring clips 32. This saves a substantial amount of time in changing molds when it is desired to shift the operation of the molding machine to the making of, for example, candies of a different shape. Further, when the mold portions are being urged together by virtue of the chains straightening out after passing around their sprockets, they will not be damaged in the event that a hard object such as a piece of hard candy is caught between the flat opposed mold faces since under these conditions the spring clip will simply yield as is illustrated in the lower portion of FIGURE 3 where a piece of hard candy 60 is caught between flat face portions of a mold 16. The chamfered end portions 4 and 6 of plates 2 tend to prevent any material from being caught therebetween by virtue of the slope of face 6 and the wiping action between the opposed faces.

It will be understood that the above described embodiment of the invention is merely by way of illustration and is not intended to be limiting.

What is claimed:

1. In a liquid molding machine having a pair of parallel endless conveying means the improvement comprising:
   a plurality of mold supporting plates,
   means to secure each plate to each of the conveying means with adjacent plates closely spaced,
   one portion of a split mold resting on the forward end of each plate and the other portion of the said mold resting on the rear end of the immediately preceding plate,
   each mold portion having a laterally extending flange at each side thereof, and
   a spring clip yieldingly holding down each flange and secured to the plate which the flange overlies.

2. A machine in accordance with claim 1 in which at least some of the flanges have a recess in their top surface and the adjacent clip has a boss adapted to enter said recess.

3. A machine in accordance with claim 1 in which the forward end of each plate is chamfered and is adapted to overlie a chamfered rear end of the immediately preceding plate.

References Cited
UNITED STATES PATENTS

| | | | |
|---|---|---|---|
| 1,984,027 | 12/1934 | Lyons | 107—1 |
| 2,943,727 | 7/1960 | Krupp et al. | 198—131 |
| 3,221,673 | 12/1965 | Shelly | 107—8 |

WALTER A. SCHEEL, *Primary Examiner.*

A. O. HENDERSON, *Examiner.*